No. 645,967. Patented Mar. 27, 1900.
W. S. METCALF.
PLOW COLTER.
(Application filed Nov. 15, 1899.)
(No Model.)
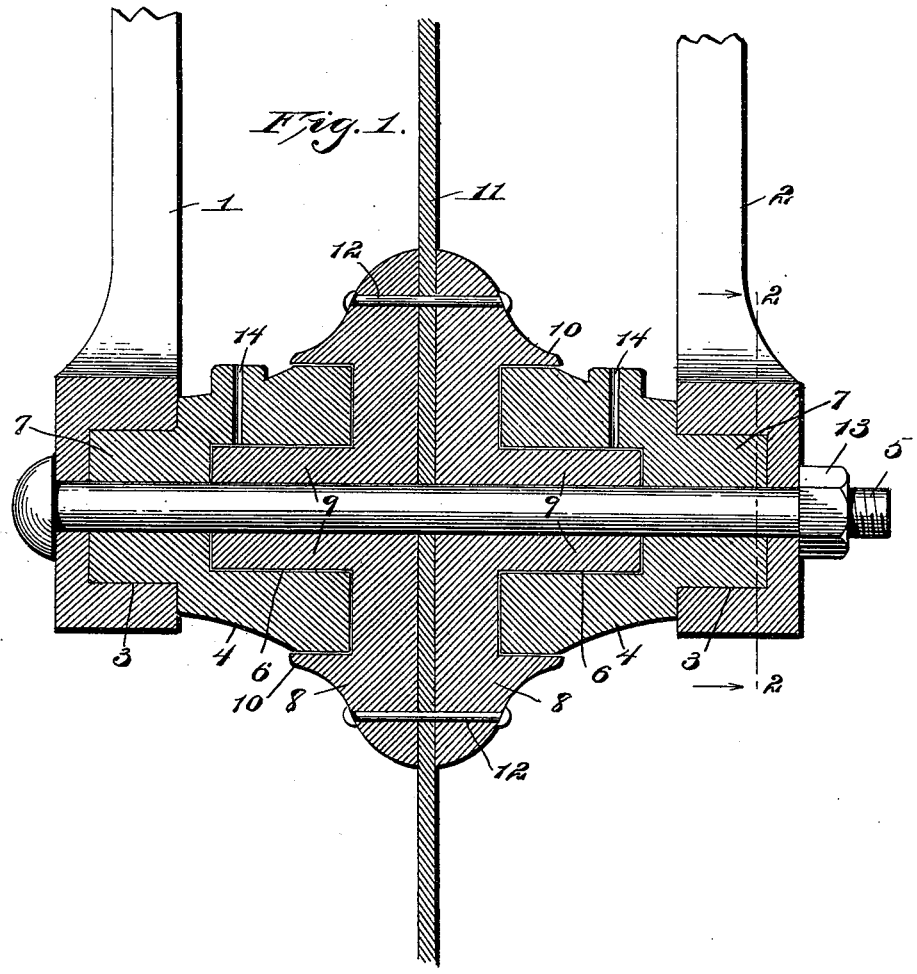
Witnesses
Louis D. Heinrichs
F. O. McCleary
Inventor
Will S. Metcalf
By Victor J. Evans
Attorney

United States Patent Office.

WILL S. METCALF, OF FLANDREAU, SOUTH DAKOTA.

PLOW-COLTER.

SPECIFICATION forming part of Letters Patent No. 645,967, dated March 27, 1900.

Application filed November 15, 1899. Serial No. 737,098. (No model.)

*To all whom it may concern:*

Be it known that I, WILL S. METCALF, a citizen of the United States, residing at Flandreau, in the county of Moody and State of South Dakota, have invented certain new and useful Improvements in Plow-Colters, of which the following is a specification.

My invention relates to plow-colters, and more particularly to improved means for journaling the colter.

The primary object is to provide effective means for excluding dust from the journals of the colter and for lubricating the same.

A further object is to provide stationary or non-revoluble bearings for the colter-journals in combination with means for compensating for wear on the journals.

The construction of the improvement will be fully described hereinafter in connection with the accompanying drawings, which form a part of this specification, and its novel features will be defined in the appended claims.

In the drawings, Figure 1 is a central transverse section of a colter and journal-supports embodying the invention, and Fig. 2 is a section on the line 2 2 of Fig. 1.

The reference-numerals 1 and 2 designate the colter-arms, each of which is recessed on its inner side to form a square seat 3 for the bearings 4 of the colter-hub. The arms 1 and 2 are also formed with openings for the passage of the securing-bolt 5.

The bearings 4 are formed on their inner sides with cylindrical seats 6 and on their outer sides with squared projections 7, which latter fit the squared seats 3 of the colter-arms, so that the bearings are held against rotation.

The colter-hub comprises two counterpart oppositely-disposed sections, each consisting of a disk or body portion 8, a laterally-projecting journal-sleeve 9, and an annular flange 10.

11 designates the colter, firmly clamped between the two hub-sections by rivets 12.

The sleeves 9 extend into the seats 6 of the bearings, and the flanges 10 overlap the bearings, as shown, to protect the journals 9 from dirt and dust. The bolt 5 extends through the arms, the bearings, and hub-sections, as shown, and is secured by a nut 13. Each of the bearings 4 is formed with an oil-hole 14 on its upper side, through which lubricant is fed to the journals of the hub.

By the construction thus described it will be apparent that the bearings 4 are held against rotation to provide rigid supports for the hub-journals. The frictional wear is on the journals only, and the wear may be readily taken up. The bolt 5 merely serves as a connecting device for the parts, the colter-hub being loose thereon.

I claim—

1. The combination with colter-arms, formed with recesses on their inner sides; of non-revoluble bearings secured to said arms; a colter; a hub comprising oppositely-disposed sections formed with sleeve-journals, and annular flanges overlapping said bearings; and a securing-bolt.

2. The combination with colter-arms formed on their inner sides with recesses, of bearings formed with projections fitting said recesses and secured therein to prevent rotation of the bearings; a colter; hub-sections each provided with a sleeve-journal, and an annular flange; and a bolt, extending through the arms, bearings, hub-sections, and colter.

3. The combination with colter-arms having square recesses on their inner surface; of bearings having cylindrical seats and squared outer ends, and formed with oil-holes; a colter; hub-sections each provided with a sleeve-journal fitting the bearings, and an annular horizontal flange overlapping the bearings; and a securing-bolt.

In testimony whereof I affix my signature in presence of two witnesses.

WILL S. METCALF.

Witnesses:
C. D. SANDERS,
FRANK W. CARR.